United States Patent [19]

Singor

[11] Patent Number: 5,004,868
[45] Date of Patent: Apr. 2, 1991

[54] SEALING ARRANGEMENT FOR AN ELECTRICAL CABLE

[75] Inventor: Aydin Singor, Balve, Fed. Rep. of Germany

[73] Assignee: Leopold Kostal GmbH & Co. KG, Ludenscheid, Fed. Rep. of Germany

[21] Appl. No.: 505,891

[22] Filed: Apr. 6, 1990

[30] Foreign Application Priority Data

Apr. 7, 1989 [DE] Fed. Rep. of Germany ....... 3911285

[51] Int. Cl.$^5$ .......................................... H02G 15/013
[52] U.S. Cl. ....................................... 174/76; 174/20; 174/22 R; 174/23 R
[58] Field of Search ...................... 174/20, 22 R, 23 R, 174/76, 77 R

[56] References Cited

U.S. PATENT DOCUMENTS

| 3,427,393 | 2/1969 | Masterson | 174/23 R |
| 4,152,538 | 5/1979 | Gassinger et al. | 174/76 X |
| 4,941,932 | 7/1990 | John | 174/90 X |

FOREIGN PATENT DOCUMENTS

| 1809058 | 9/1970 | Fed. Rep. of Germany. |
| 2205058 | 8/1973 | Fed. Rep. of Germany. |
| 3705958 | 4/1988 | Fed. Rep. of Germany. |
| 737649 | 9/1955 | United Kingdom ............. 174/77 R |

Primary Examiner—Morris H. Nimmo
Attorney, Agent, or Firm—Brooks & Kushman

[57] ABSTRACT

A sealing arrangement having a pre-sealing element and a pourable sealing compound. The sealing arrangement is intended for use in electrical cables where several insulated conductors are enclosed within an insulating hose. To achieve the desired moisture-resistant sealing effect with minimal expenditure of time and material, and to avoid damage to the cable and/or conductors, the pre-sealing element is in the form of an elastic sheath which encloses all the individual conductors at a pre-set location. The sheath comprises a tubular portion which tightly encloses the conductors, pressing them together, and a funnel-shaped portion joined with it, which fits tightly against the wall of the insulating hose.

3 Claims, 1 Drawing Sheet

SEALING ARRANGEMENT FOR AN ELECTRICAL CABLE

TECHNICAL FIELD

The invention presented relates to the sealing of an electric cable.

BACKGROUND ART

With an electric cable consisting of individual conductors enclosed by a common insulating hose, the following problem is known to arise. If the cable is used in a damp environment, the moisture can penetrate into it from one or both ends, or at a point where the insulating hose is damaged. This moisture can then reach as far as the electrical contacting elements, which generally causes a fault in a connected electrical device.

In order that the moisture may be prevented from reaching the electrical contacting elements, there are known techniques for sealing one or both final sections of the cable with a pourable sealing compound. One possible technique consists of the introduction of the pourable sealing compound into the relevant cable end until it rises to the top of the insulating hose because it has set at an undefined point inside. An improved technique is to attach a masticated caoutchouc mass as a preseal round a bundle of conductors at a predetermined distance from their free ends before the final fitting of the insulating hose. The insulating hose is then pulled far enough over the caoutchouc mass to form a final cable section which can be filled with a pourable sealing compound. These known methods, however, involve either the use of a large amount of sealing material or a process which is unacceptably time-consuming. With regard to the last-mentioned method, it must also be said that, because the presealing caoutchouc mass is placed first and the insulating hose only pulled over it afterwards, it cannot be guaranteed that the sealing mass fills out the entire diameter of the insulating hose. This means that pourable sealing compound can pass the presealing mass.

In addition, a process of sealing an electric cable has been publicized in DE 37 05 958 C1 whereby, in order to minimize expenditure of work and material, the presealing is effected by a relatively fast-hardening sealing compound—e.g. polyurethane foam—which is injected into the cable from the relevant end above a point where it is being compressed by means of a device. This method, however, also has disadvantages. On the one hand, the conductors can be damaged by the compression device, while, on the other, ugly and unwanted marking of the insulating hose can hardly be avoided.

DISCLOSURE OF INVENTION

It is an object of the present invention to develop a sealing arrangement in which the sealing process is exactly defined and the electrical cable is not negatively affected in any way.

In the present invention, this object is achieved by means of an insulating hose having one or more insulated electrical conductors within the electrical cable. A pourable sealing compound for sealing the insulating hose is located at least one end thereof. Also located within the insulating hose is a presealing element having an elastic sheath which encloses all the individual conductors at a predetermined location. The presealing element has a tubular portion which presses the conductors closely together and a funnel-shaped portion connected to the tubular portion. An outer edge of the funnel-shaped portion fits tightly against the inside wall of the insulating hose. Due to the fact that the presealing sheath is placed at a defined location in the electrical cable, the amount of pourable sealing compound required can be exactly defined and measured. This means that a moisture-resistant seal is predictably provided, even when the sealing process is automatic.

The objects, features, and advantages of the present invention are readily apparent from the following detailed description of the best mode for carrying out the invention when taken in connection with the accompanying drawing.

BEST MODE FOR CARRYING OUT THE INVENTION

Figure 1:
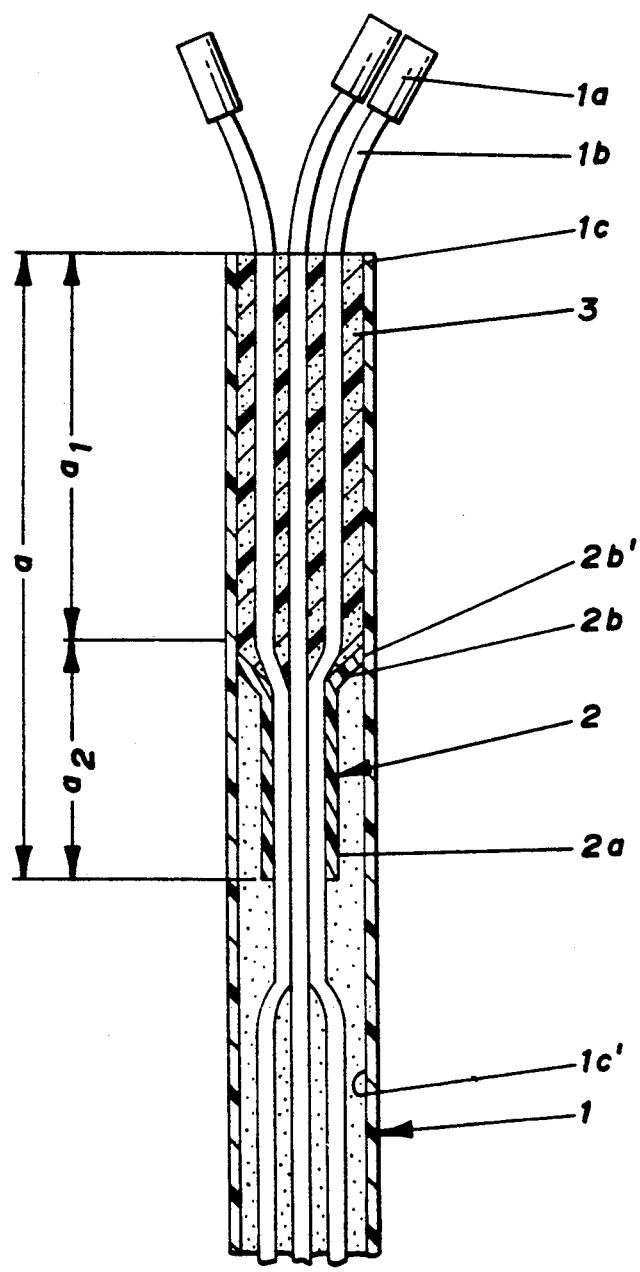
FIG. 1 is a sectional view of the sealing arrangement of the present invention.

As can be seen from the drawing, there is a sealing arrangement in the end section "a" of an electrical cable 1. The electrical cable consists of several insulated conductors 1B, which may be provided with contacting elements 1a, and an enclosing insulating hose 1c.

The sealing arrangement comprises a presealing element 2, at a predetermined position a2 with reference to the end section "a". The presealing element 2 is located inside the insulating hose 1c below a final cable section a1. A pourable sealing compound 3 fills out the end of the final cable section a1. The elastic presealing element 2, preferably manufactured of a plastic material, is shown positioned over the conductors. It is placed in position by means of a stretching and placement tool, which for simplicity is not shown. This elastic presealing element, or sheath 2 consists of a tubular portion 2a which presses the conductors tightly together and a funnel-shaped portion 2b, which are moulded from the beginning as one piece. The funnel-shaped portion 2b faces the pourable sealing compound 3, and its wider outer edge 2b', which prevents the passing of the sealing compound, fits tightly against the inner wall 1c' of the insulating hose 1c.

After the presealing element 2 has been positioned by the aforementioned tool, the pourable sealing compound 3—in the preferred embodiment comprising a polyurethane resin—is introduced into the free end of the cable.

During this process, the cable 1 is held vertically by a fixture which for simplicity again is not shown. The cable 1 remains in the fixture until the sealing compound 3 has hardened sufficiently to remain in place. Then cable 1 is removed from the fixture by suitable manual or automatic means.

Thus, there has been disclosed a sealing arrangement for use in electrical cables where one or more insulated conductors are enclosed within an insulating hose. To achieve a moisture-resistant seal with minimal expenditure of time and material, and to avoid damage to the cable and/or conductors, the elastic sheath which comprises the presealing element encloses all the individual conductors at a pre-set location. As disclosed earlier, the sheath has a tubular portion which tightly encloses the conductors, pressing them together, and a funnel-shaped portion integral with the tubular portion which fits tightly against the wall of the insulating hose, thereby providing with a pourable sealing compound a moisture-resistant sealing arrangement.

While the invention has been described in conjunction with a specific embodiment thereof, it is evident that many alternatives, modifications, and variations will be apparent to those skilled in the art in the light of the foregoing. Accordingly, it is intended to embrace all such alternatives, modifications, and variations as fall within the spirit and broad scope of the following claims.

I claim:

1. In combination with an electrical cable, a sealing arrangement comprising: an insulating hose (1c) having one or more insulated electrical conductors (1b) within the electrical cable, the end portions of said conductors protruding from said insulating hose by a length determined by connections to be made; a pourable sealing compound (3) for sealing said insulating hose at at least one end thereof; and a presealing element (2) located in said insulating hose, said presealing element comprising an elastic sheath (2) which encloses all the individual conductors (1b) at a predetermined location (a2), said sheath having a tubular portion (2a) which presses said conductors (1b) closely together and a funnel-shaped portion (2b) joined with said tubular portion (2a), the outer edge (2b') of said funnel-shaped portion (2b) fitting tightly against the inside wall of 1c') of the insulating hose (1c).

2. The sealing arrangement of claim 1, said tubular and funnel-shaped portions (2a, 2b) of said elastic sheath (2) being manufactured in one piece.

3. The sealing arrangement of claims 1 or 2, wherein the upper edge (2b') of said funnel-shaped portion (2b) of said sheath (2) fits tightly against the inner wall (1c')of said insulating tube (1c) and faces towards said pourable sealing compound (3).

* * * * *